United States Patent
McMurtry et al.

(10) Patent No.: US 7,594,337 B2
(45) Date of Patent: Sep. 29, 2009

(54) POWER AND/OR SIGNAL PATHS FOR A MACHINE TOOL ACCESSORY

(75) Inventors: David Roberts McMurtry, Dursley (GB); Geoffrey McFarland, Wotton-under-Edge (GB); David Kenneth Thomas, Bristol (GB)

(73) Assignee: Renishaw PLC, Wooton-under-Edge (GB)

( * ) Notice: Subject to any disclaimer, the term of this patent is extended or adjusted under 35 U.S.C. 154(b) by 245 days.

(21) Appl. No.: 11/886,768

(22) PCT Filed: Mar. 20, 2006

(86) PCT No.: PCT/GB2006/000989

§ 371 (c)(1),
(2), (4) Date: Sep. 20, 2007

(87) PCT Pub. No.: WO2006/100451

PCT Pub. Date: Sep. 28, 2006

(65) Prior Publication Data

US 2009/0080990 A1    Mar. 26, 2009

(30) Foreign Application Priority Data

Mar. 24, 2005   (GB) ................................ 0506157.7

(51) Int. Cl.
*G01B 5/00* (2006.01)
(52) U.S. Cl. .......................................... 33/503; 33/559
(58) Field of Classification Search .................. 33/503, 33/505, 556, 558, 559, 561; 340/870.31; 324/149, 158.1, 207.16, 262
See application file for complete search history.

(56) References Cited

U.S. PATENT DOCUMENTS

| 4,339,714 | A | | 7/1982 | Ellis |
| 4,536,661 | A | | 8/1985 | McMurtry |
| 4,603,484 | A | * | 8/1986 | Strothmann .............. 33/366.22 |
| 5,109,223 | A | | 4/1992 | Schmitt et al. |
| 5,257,199 | A | | 10/1993 | Tsujino et al. |
| 5,791,836 | A | | 8/1998 | Feufel |
| 6,839,563 | B1 | * | 1/2005 | Kirby et al. .................... 33/503 |
| 6,922,904 | B2 | * | 8/2005 | Groell et al. .................. 33/558 |

(Continued)

FOREIGN PATENT DOCUMENTS

EP   0 117 354 A1   9/1984

(Continued)

*Primary Examiner*—Yaritza Guadalupe-McCall
(74) *Attorney, Agent, or Firm*—Oliff & Berridge, PLC (57) ABSTRACT

A tool shank (18;38;138) is described that comprises a spindle attachment portion (20) that is removably attachable to the rotatable spindle (12) of a machine tool (10), a shank body portion (21;121) which extends beyond the end of the spindle when the tool shank (18;38;138) is attached to the spindle (12) of a machine tool (10) and the first part (26;38; 148) of a separable electrical coupling (22;132). The shank body portion comprises a feature (28;128) suitable for engagement with a tool change device (29) and the first part (26;38;148) of the separable electrical coupling (22;132) is located on the shank body portion (21;121) between the feature (28;128) and the spindle attachment portion (20). A machine tool (10), and a kit for retrofitting a machine tool (10), that comprise the second part (24;148) of the separable electrical coupling (22;132) are also described.

20 Claims, 9 Drawing Sheets

U.S. PATENT DOCUMENTS

| | | | |
|---|---|---|---|
| 7,076,880 B2 * | 7/2006 | Sergyeyenko et al. | 33/286 |
| 7,328,519 B2 * | 2/2008 | Harding et al. | 33/561 |
| 7,364,393 B2 * | 4/2008 | Collingwood et al. | 409/231 |
| 7,555,844 B2 * | 7/2009 | Wisniewski | 33/626 |
| 2005/0172506 A1 | 8/2005 | Collingwood et al. | |
| 2007/0068025 A1 | 3/2007 | Harding et al. | |
| 2008/0105094 A1 * | 5/2008 | McMurtry et al. | 82/118 |
| 2008/0164045 A1 * | 7/2008 | Collingwood et al. | 173/217 |

FOREIGN PATENT DOCUMENTS

| | | |
|---|---|---|
| EP | 1 114 693 A2 | 7/2001 |
| JP | A 01-177949 | 7/1989 |
| WO | WO 03/089188 A1 | 10/2003 |

* cited by examiner

POWER AND/OR SIGNAL PATHS FOR A MACHINE TOOL ACCESSORY

The present invention relates to the supply of power to and/or communication with a machine tool accessory fittable to a continuously rotatable spindle of a machine tool.

Machine tools have become more versatile in recent years. For example, it is now possible to fit a measurement probe in the location normally used for a cutting tool. Such a measurement probe can then measure a machined part or perform other measurement tasks. Also desirable is the ability to fit other accessories in place of a tool.

For better versatility a power and/or a signal path are necessary between the accessory and a fixed part of the machine. It is then possible to power accessories and/or provide communications to or from the accessory. However, such a path must allow rotation of the machine tool spindle to which the accessory will be fitted.

Attempts to address the above need have been made previously; for example, U.S. Pat. No. 5,109,223 and WO 03/089188 A1 describe physical modifications of machine lay-out. The proposed signal or power paths are routed via the rotatable spindle of the machine tool, necessitating modification or re-design of the spindle. However, machine tool manufacturers are generally reluctant to modify their machines in order to implement the embodiments shown in those documents.

U.S. Pat. Nos. 5,791,836, 4,339,714, 4,536,661 and EP 1114693A2 overcome the above disadvantage by providing a power or signal path from an accessory mounted to the spindle to a part of the machine adjacent the spindle which is static relative to the spindle. So no spindle modification is required. All the devices illustrated in U.S. Pat. Nos. 5,791,836, 4,339,714, 4,536,661 and EP 1114693A2 suffer a major disadvantage because they are cumbersome and cause obstruction when different size tools are fitted to the spindle. Also, they cause obstruction to automatic tool changers used on modern machine tools.

It is an object of the present invention to provide a device for supplying a machine tool accessory with power and/or to provide a machine tool accessory with a communication path in a way which mitigates at least some of the disadvantages described above.

According to a first aspect of the invention, a tool shank comprises; a spindle attachment portion that is removably attachable to the rotatable spindle of a machine tool, a shank body portion which extends beyond the end of the spindle when the tool shank is attached to the spindle of a machine tool and the first part of a separable electrical coupling, wherein the shank body portion comprises a feature suitable for engagement with a tool change device, characterised in that the first part of the separable electrical coupling is located on the shank body portion between the feature and the spindle attachment portion.

A tool shank of the present invention has the advantage over known tool shanks of the type described above that the first part of the separable electrical coupling is located away from the feature of the tool shank that engages the tool change device. This ensures that the first part of the separable electrical coupling does not interfere with the operation of an automatic tool changing device when the tool shank is being loaded into the spindle of a machine tool. A tool shank of the present invention can thus be used in machine tools that comprise automatic tool changing devices without having to modify such devices.

Advantageously, the tool shank comprises a tool support for retaining at least one of a tool (e.g. a cutting implement) and tool accessory (e.g. a measurement probe), wherein the tool shank comprises at least one electrical path (e.g. at least one signal and/or power path) that runs from the first part of the separable electrical coupling to the tool support.

In other words, at least one electrical path may be provided through the shank body allowing power and/or communication signals to be passed between the first part of the separable electrical coupling and the tool or tool accessory mounted on the tool support. The tool or tool accessory is typically manually attached to the tool support. An electrical connector, or any other type of electrical joint, may be used to connect the tool or tool accessory to the at least one electrical path at the tool support.

Advantageously, the tool shank comprises two or more electrical paths that run from the first part of the separable electrical coupling to the tool support, each of said electrical paths being electrically isolated from the shank body portion. Each electrical path may be arranged to carry power or a communication signal of some kind. If power is supplied to a tool accessory mounted to the tool support, the tool accessory may also comprise a wireless communication system for sending data to, and/or receiving data from, a remote interface.

Preferably, the at least one electrical path runs through a cross-sectional plane of the tool shank that is perpendicular to the main rotational axis of the tool shank and includes the feature. The main rotational axis of the tool shank would be understood by a person skilled in the art to mean the axis of rotation of the tool shank when loaded into the spindle of a machine tool.

It can thus be seen that the tool support may be located at the opposite end of the tool shank to the spindle attachment portion. The electrical path(s) may then pass through a plane that includes the feature. For example, wires may be buried in the shank body portion that run from the first part of the separable coupling, past the feature, to the tool support. As would be appreciated by a person skilled in the art, the feature may comprise an annular recess or protrusion that is complementary to the arm of a tool change device.

Conveniently, the first part of the separable electrical coupling is arranged such that at least one of a conductive coupling, an inductive coupling and a capacitive coupling can be provided with a corresponding second part of the separable electrical coupling. In other words, the first and second parts of the separable electrical coupling together provide a conductive (e.g. electrical contact), inductive or capacitive coupling. The separable electrical coupling thus allows the transfer of power and or electrical signals between the first part thereof (i.e. the part mounted on the tool shank) and the second part thereof (e.g. the part mounted on an associated machine tool).

Advantageously, the first part of the separable electrical coupling comprises at least one of a annular ring and a part-annular ring. The corresponding second part of the separable electrical coupling may also comprise at least one of an annular ring and a part-annular ring. In other words, the separable coupling may comprise one or more substantially annular or part annular disks. Providing a pair of such disks enable the transfer of power; for example, by means of electromagnetism or by the conduction of electricity via physical contact therebetween.

The rings or disks may protrude from the surface of the tool shank (e.g. they may be secured to the surface of the tool shank) or they may be integrated within the shank body portion. In the latter case, the first part of the separable electrical coupling (e.g. an inductive ring) may be located in a recess formed in the shank body portion. This arrangement allows the shank body portion to be a standard shape thus ensuring that such tool shanks can still be fitted, if required, to machine tools that do not have the complimentary second part of the separable electrical coupling.

The separable electrical coupling may advantageously comprise two, relatively thin (e.g. up to 12 mm each), disks. One of these disks may form the first part of the separable electrical coupling and may protrude radially from the shank body portion. Providing such thin disks will ensure there is no obstruction of the cutting tools, the tool changing mechanism or other accessories fitted to the spindle of a machine tool. The disks may be aligned one on top of the other in the direction of the rotational axis of the spindle or may be located side by side. The disks may comprise at least a half of an annulus so that when brought together randomly they will overlap somewhere.

In this manner, an electrical connection can be readily established between the tool shank and an associated machine tool during rotation of the tool shank. Although continuous electrical connection is preferred, intermittent electrical connection may be provided, especially if only power is being supplied to a tool accessory mounted on the tool shank.

The shank may be of the oriented or non-oriented type as required. Also, the shank may be of the face contact or non-face contact type. Face contact shanks have the advantage that the first part of the separable electrical coupling will be held at a known, fixed, separation from the second part of the separable electrical coupling.

According to a second aspect of the invention, there is provided a machine tool having a rotatable spindle for releasably retaining a tool shank, wherein the machine tool comprises the second part of a separable electrical coupling, the second part of the separable electrical coupling being co-operable with the first part of a separable electrical coupling of an associated tool shank of the first aspect of the invention. The machine tool may thus be arranged such that, when the tool shank is attached to the machine tool, at least one electrical path is provided between the machine tool and the tool shank. Preferably, two or more electrical paths are provided.

Conveniently, the second part of the electrical coupling comprises an annular or part annular disk. The second part of the electrical coupling may be part annular to prevent that disk interfering with normal operation of the machine tool. For example, the part annular disk may have a cut-out portion in the region in which the tool change device is located when engaging the tool shank. The second part of the electrical coupling may thus be designed to be mounted on a specific type or design of machine tool. Alternatively, the second part of the electrical coupling may be arranged so that it can be located on many different types of machine tool.

Advantageously, the second part of the separable electrical coupling is maintained in a fixed spaced relation relative to a static part of the machine tool. In other words, the machine tool comprises a static machine part and a rotatable spindle. The second part of the separable electrical coupling is then held in a fixed position relative to the static part of the machine tool; i.e. it is held static relative to the rotatable spindle.

Advantageously, the second part of the electrical coupling is, in the absence of a tool shank being attached to the spindle of the machine tool, freely rotatable relative to the rotatable spindle. For example, the second part of the electrical coupling may be a collar or ring that is rotatably mounted to a static part of the machine tool. Such a collar or ring may be mounted co-axially with, although not driven directly by, the rotatable spindle of the machine tool.

Advantageously, the machine tool is arranged such that, when a tool shank is held by the spindle of the machine tool, the second part of the electrical coupling is arranged to engage, and rotate with, the tool shank. Conveniently, a further electrical coupling is provided to provide at least one electrical path between the second part of the electrical coupling and a portion of the machine tool that is static relative to the rotatable spindle.

In other words, the second part of the electrical coupling may be carried by a collar or similar that is rotatably mounted to the machine tool. The collar may be freely rotatable (i.e. not directly driven by the spindle of the machine tool) and arranged to engage a tool shank when such a tool shank is inserted into the spindle of the machine tool. After insertion of the tool shank into the spindle of the machine tool, the rotatable collar engages and is held in a fixed spaced relation relative to the tool shank. Rotation of the tool shank will thus cause a corresponding rotation of the collar. In such an arrangement, the first part of the co-operable coupling carried by the tool shank and the second part of the co-operable electrical coupling allow an electrical connection to be provided. Such an electrical connected may be a conductive, contact, connection. A further connection may be provided to electrically link the second part of the co-operable coupling and a static part of the machine tool. For example, the further connection may be an inductive, capacitive or contact connection (e.g. using annular or part annular rings).

Advantageously, the machine tool has a tool shank of the first aspect of the invention attached to its spindle.

Conveniently, the machine tool further comprises an automatic tool changing device, the automatic tool changing device comprising means for engaging the feature of an associated tool shank to allow the tool shank to be attached to, and removed from, the spindle of the machine tool as required. The machine tool may also be arranged to store one or more of such tool shanks in its associated tool changer apparatus.

The machine tool may further comprise means for cleaning the first and/or second parts of the separable electrical coupling prior to a tool shank being inserted in the spindle. For example, an air-blast mechanism may be used to blow waste material off the parts of the separable electrical coupling.

The location of the first part of the separable electrical coupling on the tool shank enables the majority of standard automatic tool changing devices to be used with tool shanks according to the present invention. A machine tool may thus be "retrofitted" so as to provide the additional capability to provide a power and/or signal path to a tool in the manner outlined above.

According to a third aspect of the invention, there is thus provided a kit for adapting a machine tool to enable at least one electrical path to be established between a static part of the machine tool and an associated tool shank, wherein the kit comprises the second part of a separable electrical coupling that is co-operable with the first part of the separable electrical coupling of a tool shank of the first aspect of the invention.

In this manner, a retrofit kit can be provided which, when fitted to a machine tool, allows at least one electrical connection or preferably two or more electrical connections to be established with tool shanks of the type described above. In this manner, known machine tools can be upgraded to provide a power and/or signal path to tool accessories. A particular advantage of such a retrofit kit is the ability to convert standard machine tools without any significant modification of the existing machine tool components. In other words, the kit provides a "bolt-on" addition to known machine tools and does not require the costly replacement or modification of machine spindles or the like.

According to a fourth aspect of the invention, a tool shank comprises; a tool support for retaining a tool or tool accessory, a feature suitable for engagement with a tool change device, the first part of a separable electrical coupling and at least one electrical path running from the first part of the separable electrical coupling to the tool support, wherein the tool shank is removably attachable to the rotatable spindle of a machine tool and the first part of the separable electrical coupling is co-operable with the second part of the separable electrical coupling that is located at an area of an associated machine tool that remains static relative to the rotatable spindle of that machine tool, characterised in that the at least one electrically conductive path runs through a cross-sectional plane of the shank that is perpendicular to the main rotational axis of the tool shank and includes the feature.

According to a fifth aspect of the invention, a machine tool is provided that has a rotatable spindle for releasably retaining a tool shank, wherein the machine tool comprises the second part of a separable electrical coupling, the second part of the separable electrical coupling being co-operable with the first part of a separable electrical coupling of an associated tool shank of the fourth aspect of the invention. The machine tool may thus be arranged such that, when the tool shank is attached to the machine tool, at least one electrical path is provided between the machine tool and the tool shank.

A tool shank is thus provided that is removably attachable to a continuously rotatable spindle of a machine tool, for supporting a tool or other machine tool accessory at the spindle comprising: a shank body including a feature suitable for engagement with a device which removes the shank from the spindle; part of a separable coupling for providing a power and/or signal path to the tool or other machine tool accessory co-operable with a complementary separable part of the coupling at an area of the machine tool which remains static relative to the rotatable spindle; and at least one power and/or signal path isolated from the body which runs through the shank body at a cross section of the body which includes the feature.

A machine tool is also provided that comprises: a housing area; a spindle rotatable relative to the housing area and supported thereby; a tool shank removably attachable to the spindle of a machine tool, for supporting a tool or other machine tool accessory at the spindle including a shank body having a feature suitable for engagement with a device which removes the shank from the spindle; a power and/or signal path isolated from the body for power supply or signal communication with the tool or accessory, running from the housing area to the shank via a coupling having first and second relatively rotatable separable parts, wherein the path runs through the shank body at a cross section of the body which includes the feature.

Also provided is a tool shank removably attachable to the spindle of a machine tool, for supporting a tool or other machine tool accessory at the spindle comprising: a portion which attaches to the spindle and a portion which extends beyond the end of the spindle when the shank is attached to the spindle, the portion which extends beyond the spindle including a feature suitable for engagement with a device which removes the shank from the spindle; and part of a separable coupling for providing a power and/or signal path to the tool or other machine tool accessory mounted to the shank between the portion which attaches to the spindle, and the said feature.

A machine tool is also described that comprises: a housing area; a spindle rotatable relative to the housing area and supported thereby; a tool shank removably attachable to the spindle for supporting a tool or other machine tool accessory at the spindle, having a portion which attaches to the spindle and a portion which extends beyond the end of the spindle when the shank is attached to the spindle, the shank including a feature suitable for engagement with a tool change device; and a power and/or signal path for power supply or signal communication with the tool or accessory, running from the housing area to the shank via a coupling having first and second relatively rotatable separable parts, wherein the first part is mounted to the shank and the second part is mounted at the housing area such that the parts provide the path when the shank is attached to the spindle and the parts provide no path when they are separated by removal of the shank from the spindle.

The invention will now be described, by way of example only, with reference to the following drawings in which:

FIGS. 2b and 2c show details of the embodiment shown in FIG. 2a;

Figure 1:
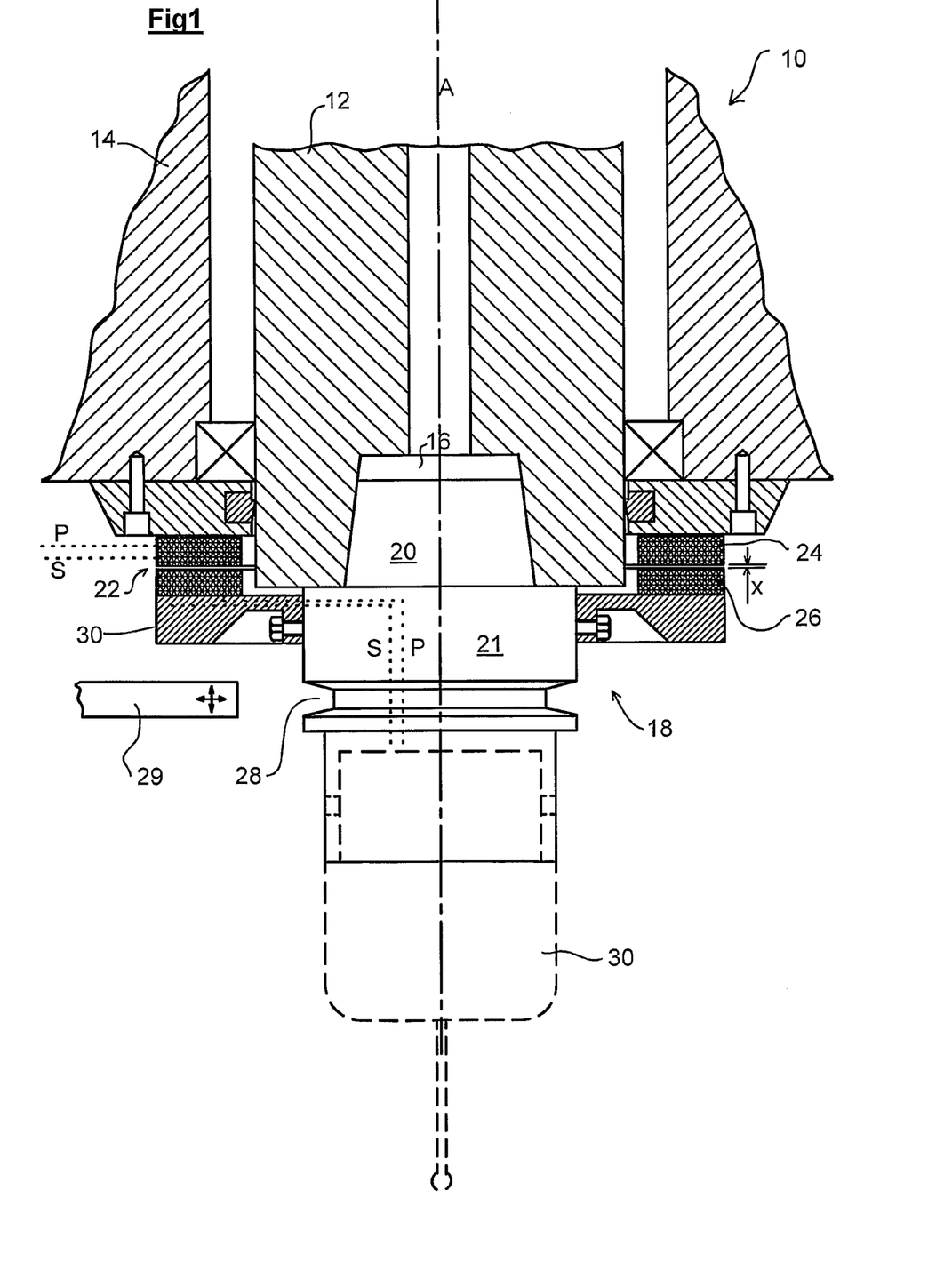
FIG. 1 shows a first embodiment of the invention.

FIG. 1 shows a section of a machine tool 10 having a spindle 12 rotatable about an axis A driven by a motor (not shown). The spindle is mounted in a housing 14 which is static relative to the spindle 12. The spindle has a tool shank accepting area 16 usually called a "spindle nose", into which a complementary tool shank 18 is releasably attached.

In all the embodiments the tool shank 18 is a taper fitting 20 of standard ISO defined dimensions but any shape can be used. In FIG. 1 the tool shank 18 is a so-called HSK standard. The shank supports an accessory 30 shown in chain-dotted outline, which in this instance is a measurement probe 30, but could be any accessory.

Signal and power paths S and P are provided to the accessory via an inductive link 22. The link comprises an upper disk 24 and a lower disk 26 spaced closely by a small gap x. Each disk is annular. Details of the link are shown in FIG. 2c and described below. The upper disk 24 is fixed to the housing 14 and the lower disk is mounted to the shank 18 using an adapter plate 30.

In use the shank 18 is removable from the spindle by means of an automatic tool change device 29 which engages with a feature of the shank, in this instance a standard size annular recess in the form of a slot 28 in the shank 18. The lower disk 26 and plate 30 come away with the shank 18 when it is removed by the tool change device 29. The plate 30 is fixed to the shank 18 at a portion of the shank 21 which is between the taper 20 and the slot 28.

It can be seen that what remains when the shank is removed using the tool change device 29 is just the upper disk 24 which is not obtrusive and will not obstruct other shanks fitted to the spindle nose.

Figure 2A:
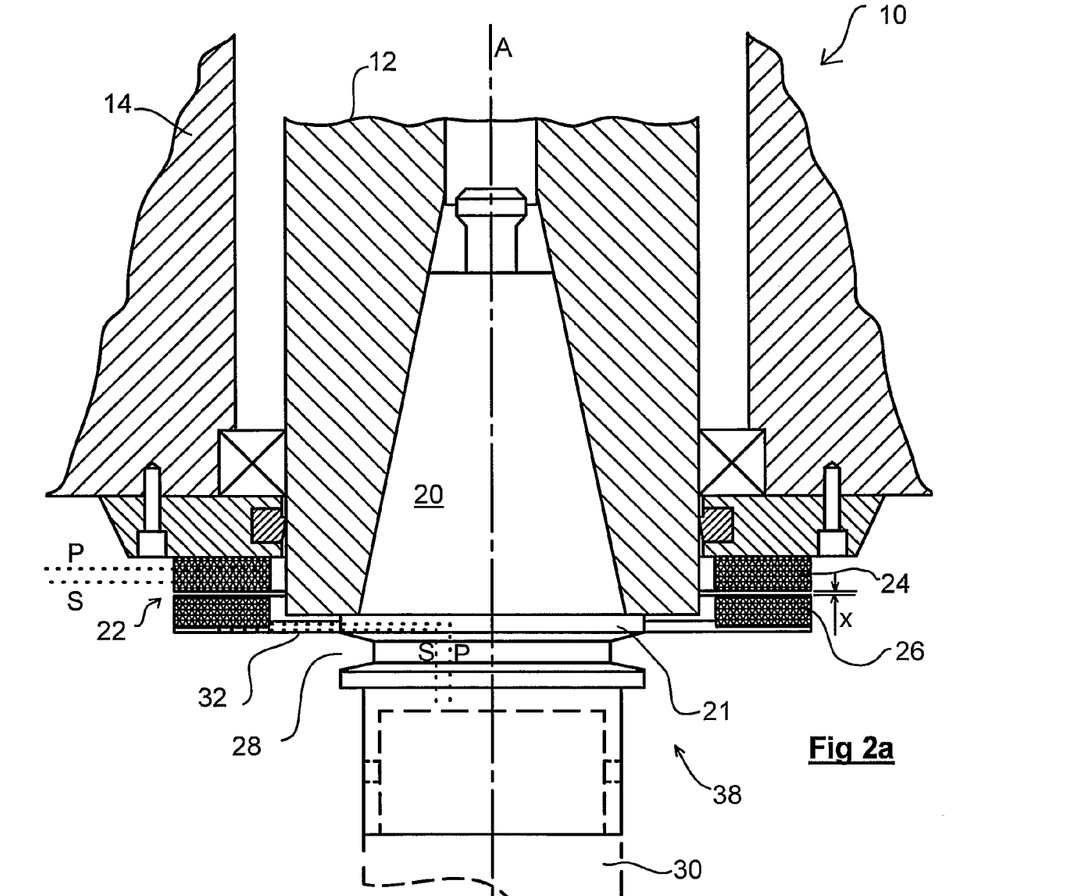
FIG. 2a shows a second embodiment of the invention.

FIG. 2a shows a second embodiment of the invention. In this embodiment a BT standard shank 38 is shown which has a different arrangement to the shank 18 shown in FIG. 1. Features common to the embodiments shown in FIGS. 1 and 2 have like reference numerals.

Adapter plate 32 is modified when compared with plate 30 in FIG. 1. Plate 32 has to clear the autochanger slot 28 and so is much thinner than the plate 30 shown in FIG. 1.

Figure 2B:
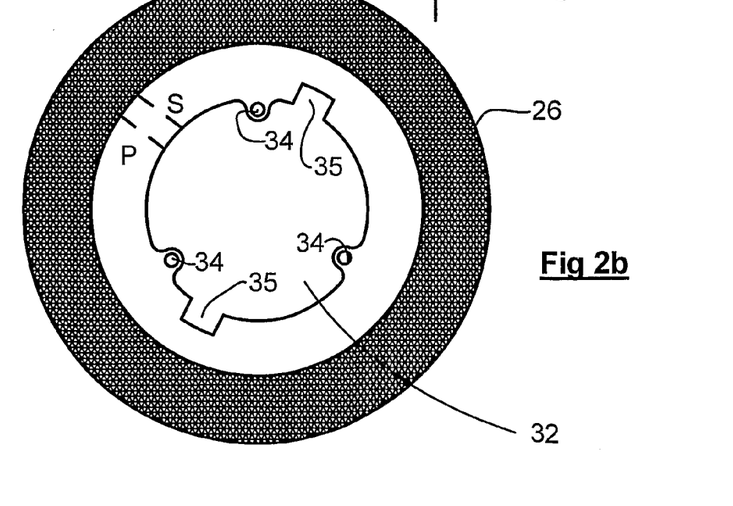
Figure 2C:
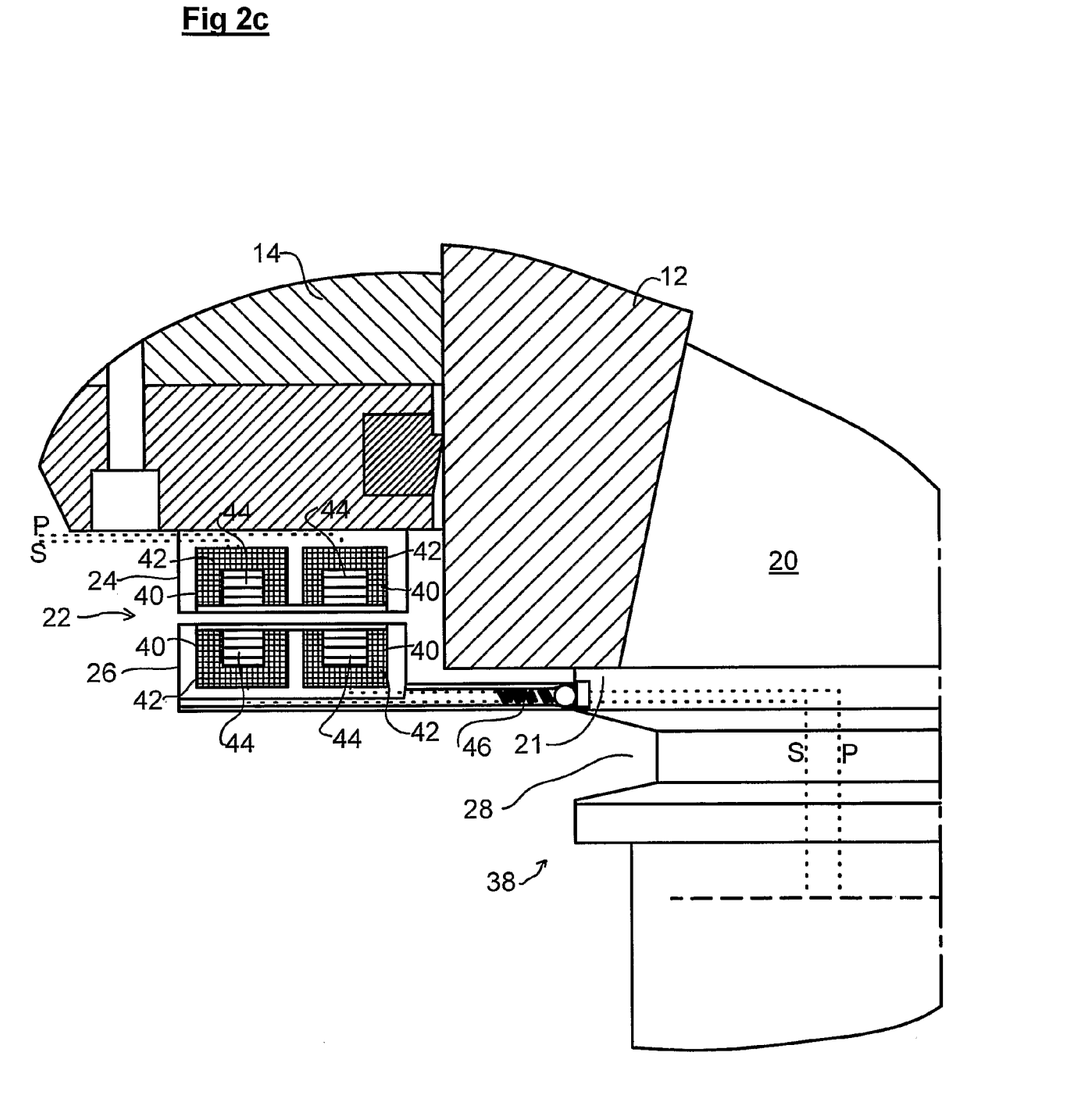

FIG. 2b shows a plan view of plate 32 and lower disk 26. The plate has attachment lugs 34 which are used to attach it to complementary recesses (not shown) in shank 38. Cut-outs 35 ensure that the plate 32 does not foul spindle drive dogs (not shown).

FIG. 2c shows an enlarged detail view of the link 22 shown. Inductive disks 24 and 26 are each formed as follows:

Two annular channels 40 are formed in each of the two disks. Ferrite U-shaped elements 42 are located in the channels. A plurality of such elements can be fitted in series into the channel 40 to make a circumferential row of elements. A multi-layer circuit board 44 is inserted into the centre of the unshaped elements 42 as shown. The circuit board 44 forms a circuitous path for conductive tracks on the circuit board, in place of conventional copper coils. Thus, current flowing through the conductive paths magnetises the ferrite elements and these in turn magnetise the complementary ferrite elements on the other of the disks. So, in this instance both signal and power can cross the link 22. The arrangement described in this paragraph can be used for the link 22 shown in FIG. 1.

The connection between plate 32 and shank 38 is via a spring contact or may be by means of other suitable connection e.g. continuous wires. More than one contact will be required if power and signal communications are needed.

Figure 3:
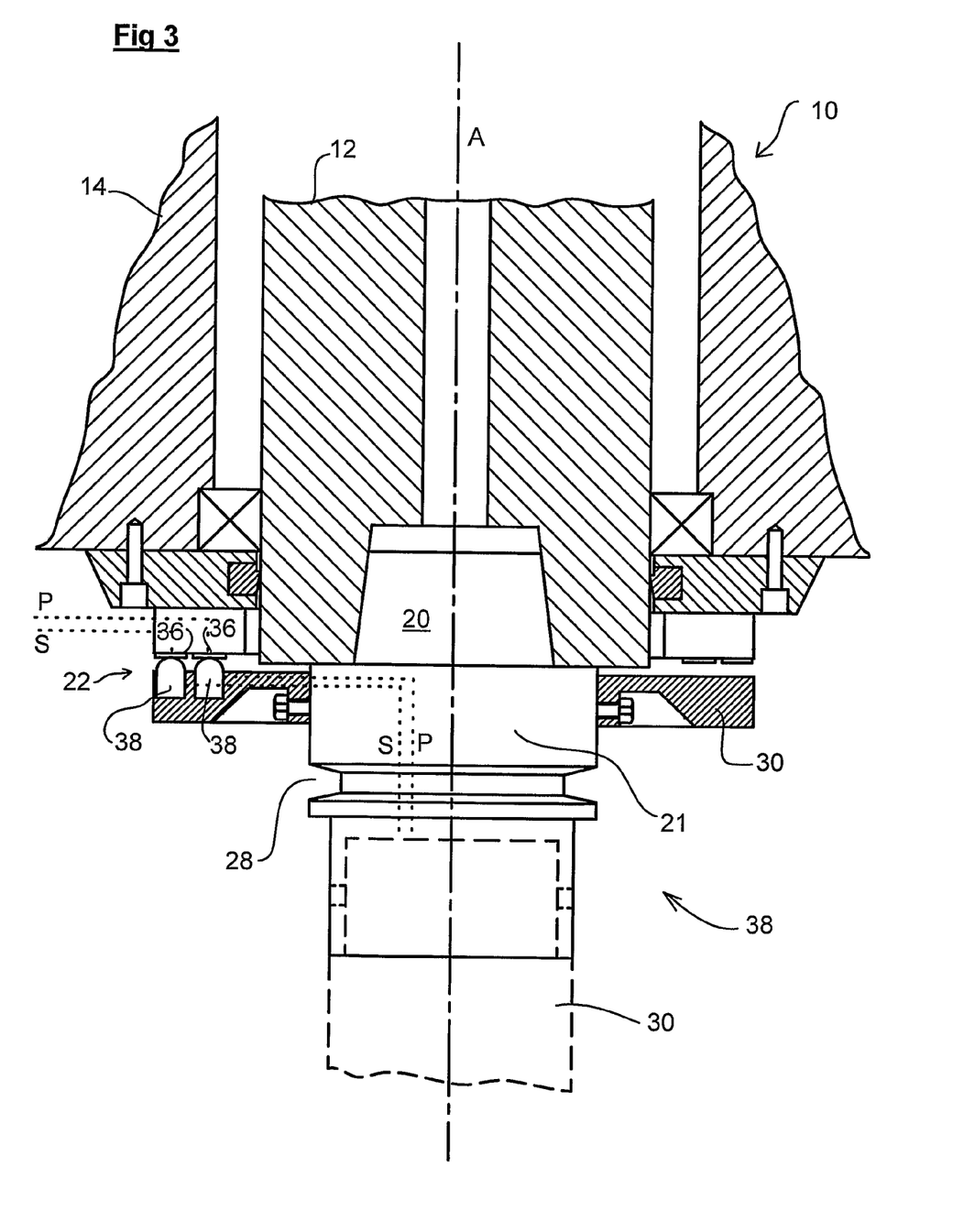
FIG. 3 shows a third embodiment of the invention.

FIG. 3 shows a third embodiment of the invention. Features common to the embodiment shown in FIG. 1 have like reference numerals.

In this embodiment the paths S and P between the static housing and the accessory include slip rings 36 and spring contacts 38. The slip rings 36 are shown on the static part of the machine but they could be provided on the adapter plate.

Figure 4A:
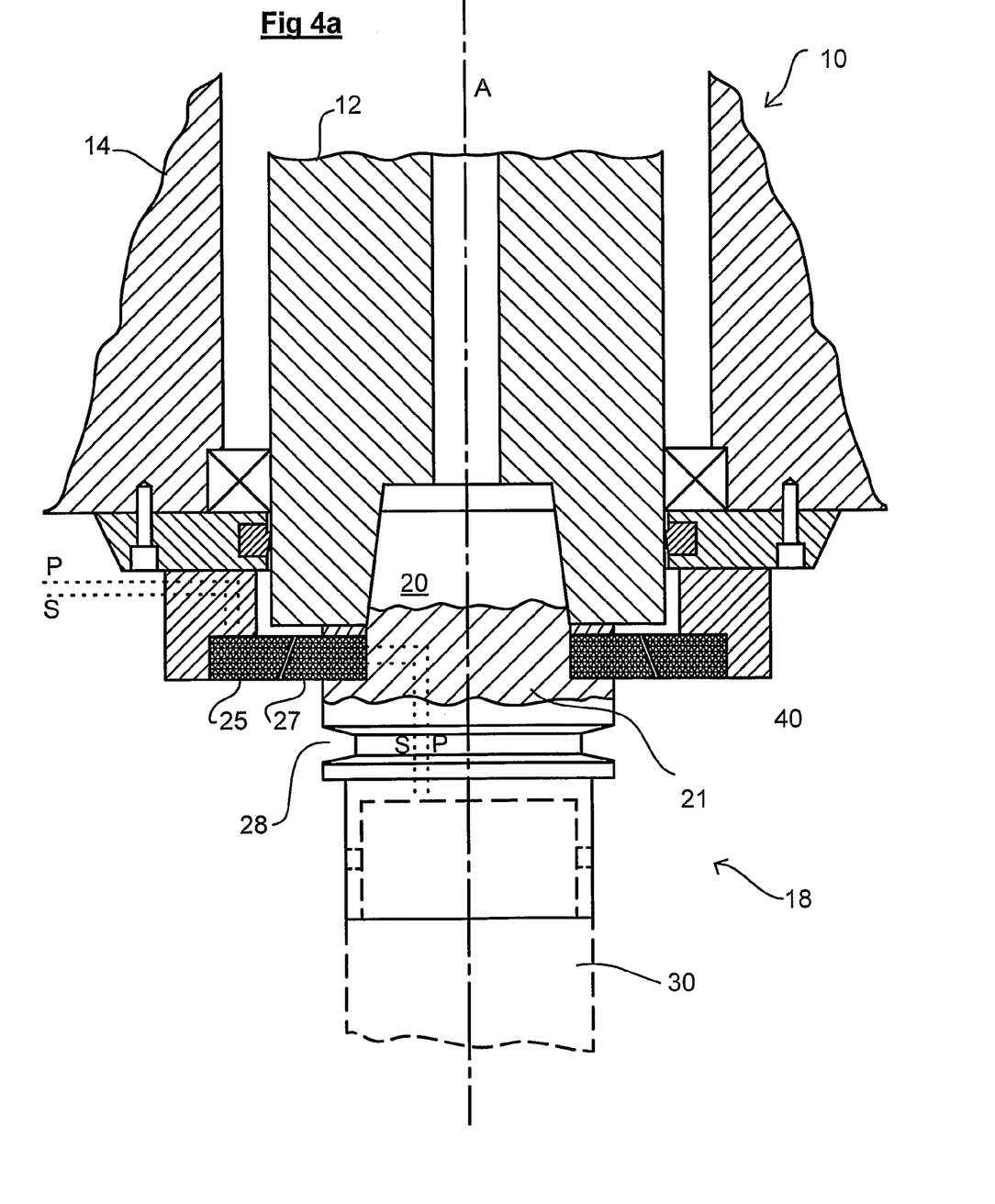
FIGS. 4a,4b,5, 6 show further embodiments of the invention.

The embodiment shown in FIG. 4a provides an alternative arrangement of inductive disks. The disks 25 and 27 are arranged side by side and not one on top of the other as shown in previous embodiments. The advantage of the side by side arrangement is that a thinner overall construction can be obtained.

Figure 4B:
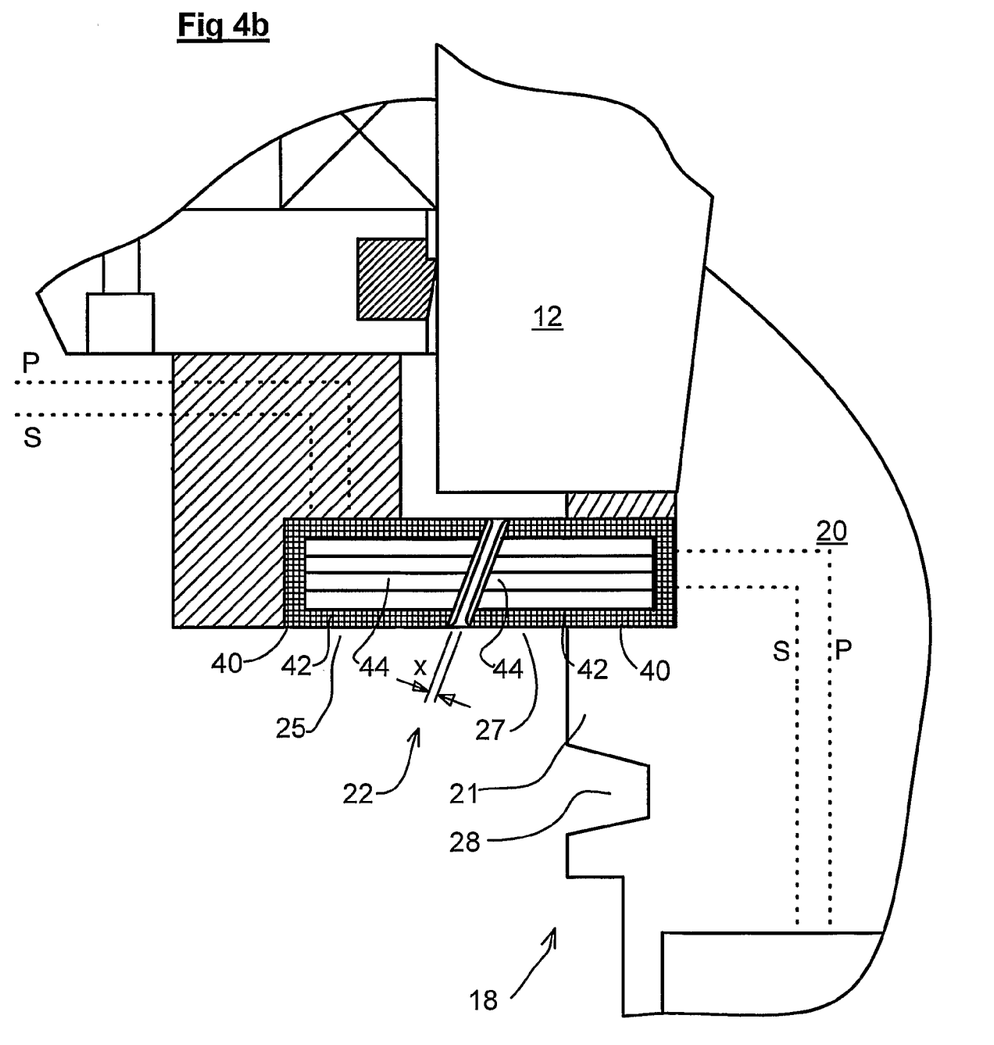

FIG. 4b shows details of the link 22 of FIG. 4a.

The construction is similar to that described above with reference to FIG. 2c.

Gap x is oblique so that the shank 18 (together with disk 27) can be inserted and removed with ease.

Figure 5:
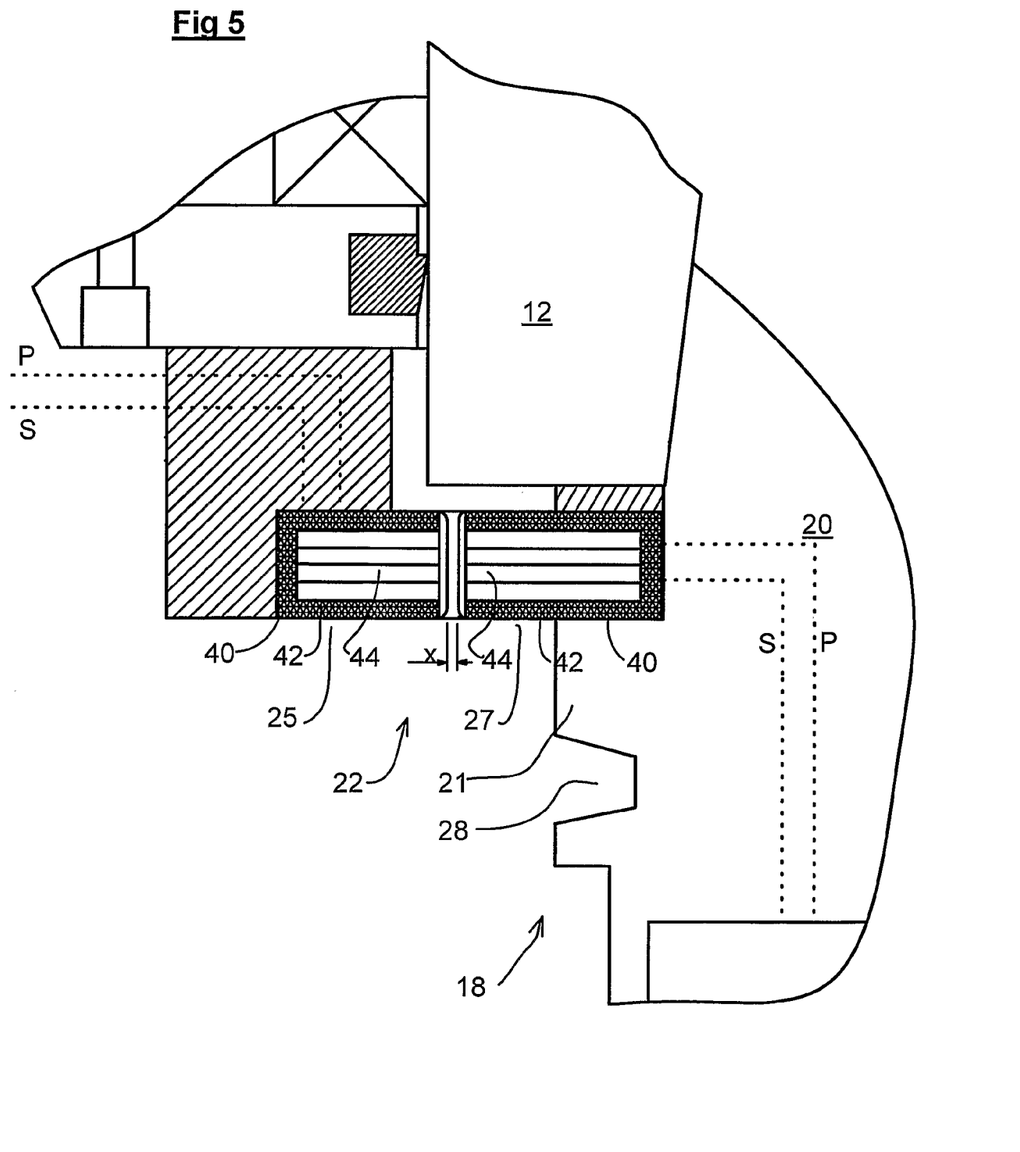

An alternative arrangement is shown in FIG. 5, having a gap x parallel to the axis A of rotation of the spindle 12, thus making manufacture more simple.

If required, the inductive disks of the shank 18 could be fully or partially contained in a recess formed in the shank. For example, a ring could be ground out of the shank in which the annular disc can be placed. If such an annular disc provides an inductive link, a toughened surface coating could be applied over the ring. In this manner, the shank 18 could have similar or identical outer dimensions to a standard shank.

Figure 6:
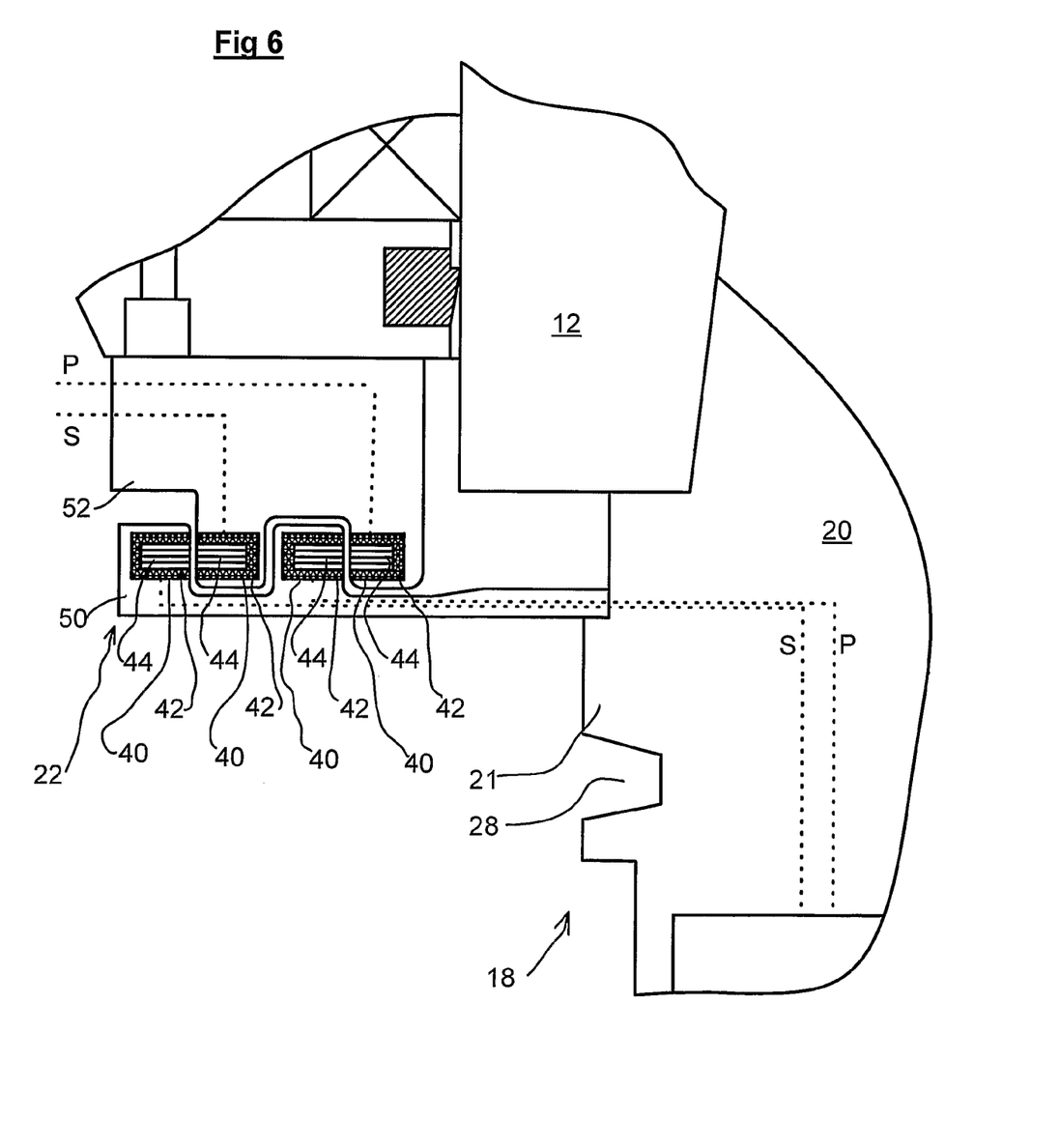

A further embodiment is shown in FIG. 6. Two separate paths P and S are shown through inductive link 22. In this alternative two inductive paths are formed from two arrangements 50 and 52 similar to the arrangements described with reference to FIG. 2c except that the inductive elements are separated by gaps which, similar to the gap shown in FIG. 5, extends parallel to the axis A. Thus separate power and signal paths are possible with a side by side arrangement also.

Further embodiments, modifications and variants to the embodiments shown will be apparent to the skilled addressee. The links 22 have been shown as either inductive or physical contact. Other links could be used e.g. R.F. capacitive, optical, pneumatic, hydraulic, all of which should be separable. A mix of systems could be employed e.g. physical contact and inductive coupling. It is possible that power only may be supplied to the accessory, signal only (one or two way), or both. If power only is supplied a signal communication may be provided by another means and/or another path e.g. power may be supplied inductively as described whereas signal communication may be provided by a separate radio or optical link to a base station.

In the figures the gap x is ideally about 0.5 mm or less but is preferably less than 1 mm. For space saving the thickness of the components 24,26,25,27,50 or 52 in the direction of the axis of rotation A of the shank/spindle is preferably less than 12 mm. It is possible to make these components with an overall thickness of 6 mm or less, and yet still provide power of up to 100 W to an accessory.

The invention relates to a machine tool adapted as described above and also a machine tool shank as shown. When the modified shank is removed a conventional shank or another modified shank can be fitted in its place.

If a conventional shank is fitted with a cutting tool it is important to provide protection for the remaining parts 24,36, 25 and 50/52. Such protection could be afforded by a removable cover (not shown) or more preferably a ceramic or other non-magnetic and hard wearing surface coating (e.g. diamond-like carbon) on the surface of the remaining parts. Such protection will prevent damage from knocks and metal chips caused by a cutting process.

The disks shown are annular. It is possible to make the disks (24,26;25,27;50,52) part annular. If part annular disks are used they should preferably overlap. If it is not possible to stop the spindle in a known position then it will stop randomly, so preferably the disks are at least greater than semicircular so that random stopping always results in an overlap.

Figure 7:
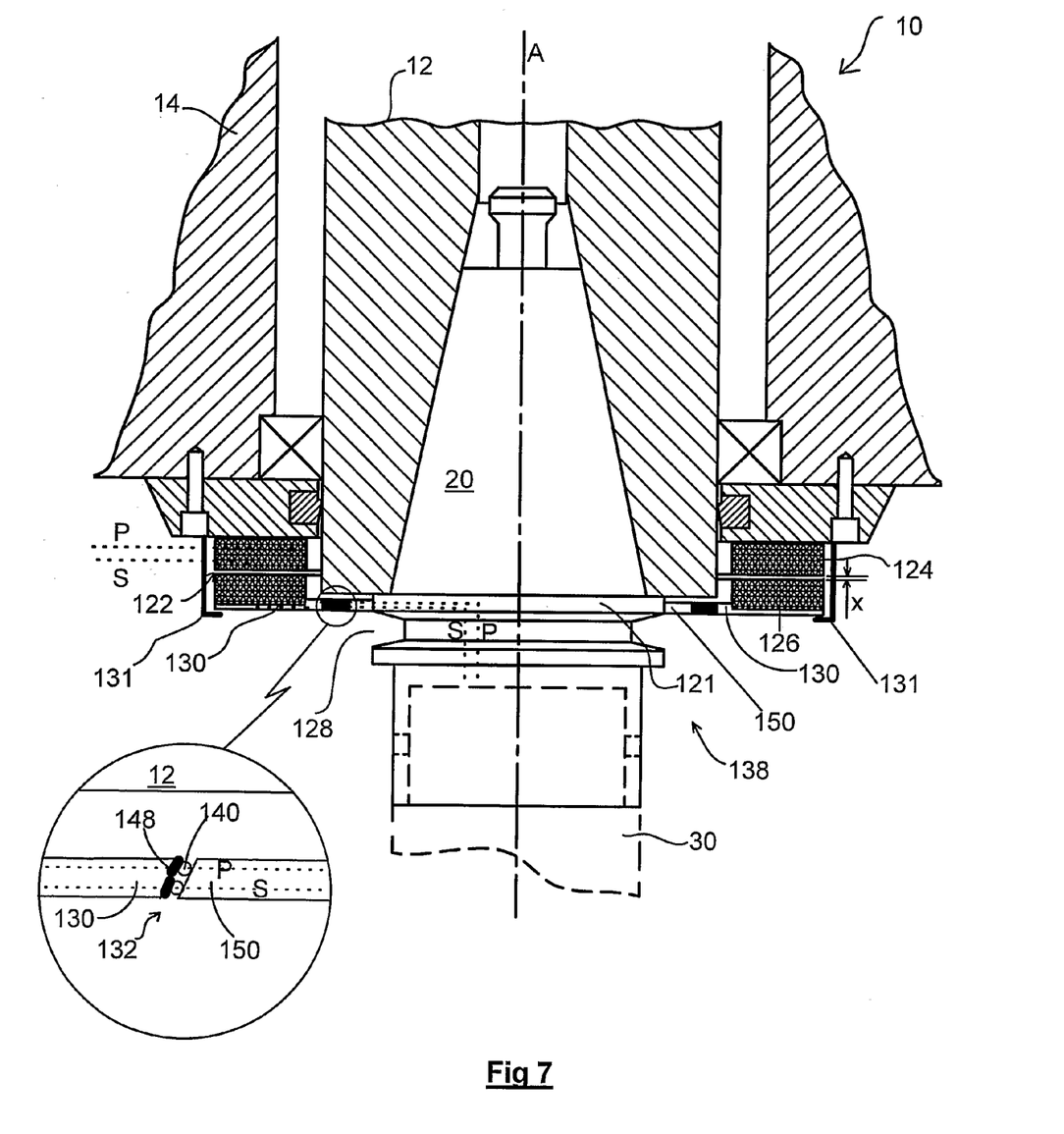
FIG. 7 shows a two-part coupling of the present invention.

Referring to FIG. 7, a further embodiment of the invention is illustrated. In common with the previous figures, the tool shank 138 has a taper 20 which is inserted into the spindle 12 of a machine tool 10. The tool shank also comprises a radially protruding plate 150.

The apparatus also comprises a ring portion 130 which is mounted to the machine tool 10. In the absence of an attached tool shank, the ring portion 130 is freely rotatable about an axis that is co-axial with the axis (A) of rotation of the spindle. A bracket 131 is also provided to retain the ring portion 130 when no tool shank is attached to the spindle of the machine tool.

On insertion of a tool shank into the spindle, electrical contacts 140 of the plate 150 are arranged to engage corresponding electrical contact pads 148 of the ring portion 130. In this manner, a first connector provides a signal and power path from the tool shank to the ring portion 130. Furthermore, engagement of the plate 150 with the ring portion 130 provides a physical connection such that the ring portion 130 rotates with the tool shank. Additional mechanical locking means (not shown) may be provided if required.

The power and signal paths pass from the ring portion 130 to the machine tool 10 via a further electrical connection 122. The further electrical connection 122 may be an inductive link having an upper disk 124 and a lower disk 126; such a link is analogous to the link 22 described in more detail with reference to FIG. 1.

In this manner, a two stage power coupling is provided. An arrangement of the type shown in FIG. 7 allows the footprint of the tool shank to be reduced compared with that of the tool shank of FIG. 1. This can be advantageous where space in the automatic tool changer device is somewhat limited. For example, the tool shank of FIG. 7 may fit within a single tool changer slot whereas the tool shank shown in FIG. 1 may extended beyond such a slot thus requiring adjacent storage slots of the tool changer to be left vacant. Providing a contact (conductive) linkage on the tool shank will also cost less than providing an inductive link.

The invention claimed is:

1. A tool shank comprising;
   a spindle attachment portion that is removably attachable to the rotatable spindle of an associated machine tool;
   a shank body portion that extends beyond the end of the spindle when the tool shank is attached thereto;
   a feature on the shank body portion suitable for engagement with a tool change device; and
   a first part of a separable electrical coupling, the first part being located on the shank body portion between the feature and the spindle attachment portion;
   wherein the first part of the separable electrical coupling establishes at least one electrical connection with a second part of the separable electrical coupling provided on the machine tool, the separable electrical coupling providing at least one electrical connection between the tool shank and the associated machine tool during rotation of the tool shank by the machine tool;
   wherein, when the tool shank is attached to the spindle of the machine tool, the first and second parts of the separable electrical coupling are separated by a gap of less than 1 mm.

2. A tool shank according to claim 1 comprising a tool support for retaining at least one of a tool and a tool accessory, wherein the tool shank comprises at least one electrical path that runs from the first part of the separable electrical coupling to the tool support, the at least one electrical path being electrically isolated from the shank body portion.

3. A tool shank according to claim 2 wherein the at least one electrical path runs through a cross-sectional plane of the tool shank that is perpendicular to the main rotational axis of the tool shank and includes the feature.

4. A tool shank according to claim 1 wherein the first part of the separable electrical coupling provides at least one of a conductive coupling, an inductive coupling and a capacitive coupling with a corresponding second part of the separable electrical coupling.

5. A tool shank according to claim 1 wherein the first part of the separable electrical coupling comprises at least one of an annular ring and a part-annular ring.

6. Machine tool apparatus comprising a machine tool having a rotatable spindle and a tool shank according to claim 1, wherein the tool shank is releasably retainable in the spindle, wherein the machine tool comprises the second part of a separable electrical coupling that is co-operable with the first part of the separable electrical coupling of the tool shank.

7. An apparatus according to claim 6 wherein the second part of the separable electrical coupling is maintained in a fixed spaced relation relative to a static part of the machine tool.

8. An apparatus according to claim 6 wherein the second part of the electrical coupling is, in the absence of a tool shank being attached to the spindle of the machine tool, freely rotatable relative to the rotatable spindle.

9. An apparatus according to claim 8 that is arranged such that, when the tool shank is held by the spindle of the machine tool, the second part of the electrical coupling engages, and rotates with, the tool shank.

10. An apparatus according to claim 9 wherein a further electrical coupling provides at least one electrical path between the second part of the electrical coupling and a portion of the machine tool that is static relative to the rotatable spindle.

11. An apparatus according to claim 6 wherein the machine tool comprises an automatic tool changing device, the automatic tool changing device comprising a gripping mechanism for engaging the feature of the tool shank to allow the tool shank to be attached to, and removed from, the spindle of the machine tool as required.

12. Machine tool apparatus comprising a tool shank and a machine tool;
    the tool shank comprising a spindle attachment portion, a shank body, a tool change feature provided on the shank body and a first part of a separable electrical coupling, the first part being located on the shank body portion between the feature and the spindle attachment portion;
    the machine tool comprising a housing, a spindle rotatable relative to the housing and a second part of a separable electrical coupling;
    wherein the spindle attachment portion of the tool shank is releasably attachable to the spindle of the machine tool,
    wherein, when the spindle attachment portion of the tool shank is attached to the spindle of the machine tool, the first and second parts of the separable electrical coupling provide at least one electrical connection between the tool shank and the machine tool, the at least one electrical connection being maintained during rotation of the tool shank by the spindle of the machine tool,
    wherein, when the spindle attachment portion of the tool shank is attached to the spindle of the machine tool, the first and second parts of the separable electrical coupling are separated by a gap of less than 1 mm.

13. An apparatus according to claim 12 wherein the first and second parts of the separable electrical coupling provide a plurality of separate electrical connections between the tool shank and the machine tool.

14. A tool shank comprising;
    a tool support for retaining at least one of a tool and a tool accessory;
    a feature suitable for engagement with a tool change device;
    a first part of a separable electrical coupling; and
    at least one electrical path running from the first part of the separable electrical coupling to the tool support through a cross-sectional plane of the tool shank that is perpendicular to the main rotational axis of the shank and includes the feature,
    wherein the tool shank is removably attachable to the rotatable spindle of a machine tool,
    wherein the first part of the separable electrical coupling is co-operable with a second part of the separable electrical coupling that is located at an area of the machine tool that remains static relative to the rotatable spindle of that machine tool,
       wherein the separable electrical coupling provides at least one electrical connection between the machine tool and the tool shank during rotation of the tool shank by the machine tool,
       wherein, when the tool shank is attached to the rotatable spindle of the machine tool, the first and second parts of the separable electrical coupling are separated by a gap of less than 1 mm.

15. A tool shank comprising;
    a spindle attachment portion that is removably attachable to the rotatable spindle of a machine tool;
    a shank body portion which extends beyond the end of the spindle when the tool shank is attached to the spindle of a machine tool;
    a feature provided on the shank body portion that is suitable for engagement with a tool change device; and
    a first part of a separable electrical coupling located on the shank body portion between the feature and the spindle attachment portion;

wherein the separable electrical coupling provides a plurality of separate electrical connections between the tool shank and an associated machine tool, the plurality of electrical connections being maintained during rotation of the tool shank by the machine tool.

16. A tool shank according to claim 15 wherein the first part of the separable electrical coupling is arranged such that at least one of a conductive coupling, an inductive coupling and a capacitive coupling can be provided with a corresponding second part of the separable electrical coupling that is provided on a machine tool.

17. A tool shank according to claim 15 wherein the first part of the separable electrical coupling comprises at least two annular rings.

18. A tool shank according to claim 15 wherein the first part of the separable electrical coupling comprises at least two part-annular rings.

19. Machine tool apparatus comprising a tool shank and a machine tool;

the tool shank comprising a spindle attachment portion, a shank body, a tool change feature provided on the shank body and a first part of a separable electrical coupling;

the machine tool comprising a housing, a spindle rotatable relative to the housing and a second part of the separable electrical coupling;

wherein the spindle attachment portion of the tool shank is releasably attachable to the spindle of the machine tool;

wherein, when the spindle attachment portion of the tool shank is attached to the spindle of the machine tool, the first and second parts of the separable electrical coupling provide at least one electrical connection between the tool shank and the machine tool;

wherein the second part of the electrical coupling is freely rotatable relative to the rotatable spindle in the absence of a tool shank being attached to the spindle and engages, and rotates with, the tool shank when the tool shank is attached to the spindle of the machine tool.

20. An apparatus according to claim 19 wherein the first and second parts of the separable electrical coupling provide a plurality of electrical connections between the tool shank and the machine tool.

* * * * *